United States Patent [19]

Rinderer

[11] Patent Number: 5,100,086
[45] Date of Patent: Mar. 31, 1992

[54] CABLE TRAY SUPPORT SYSTEM
[75] Inventor: Eric R. Rinderer, Highland, Ill.
[73] Assignee: B-Line Systems, Inc., Highland, Ill.
[21] Appl. No.: 512,855
[22] Filed: Apr. 23, 1990
[51] Int. Cl.⁵ .............................................. F16L 3/22
[52] U.S. Cl. .................................... 248/49; 248/58; 248/68.1
[58] Field of Search ............... 248/49, 58, 68.1, 201, 248/912, 558, 316.1, 316.86

[56] References Cited

U.S. PATENT DOCUMENTS

| | | |
|---|---|---|
| 1,097,273 | 5/1914 | Tyler . |
| 2,026,312 | 12/1935 | Houts .............................. 248/68.1 X |
| 2,353,445 | 7/1944 | Carpenter et al. ................. 248/68.1 |
| 2,891,750 | 6/1959 | Bergquist ............................. 248/58 |
| 2,912,197 | 11/1959 | Hudson .......................... 248/68.1 X |
| 2,978,573 | 4/1961 | Kalbrunner ........................... 240/78 |
| 3,034,753 | 5/1962 | Johnston et al. ..................... 248/59 |
| 3,137,468 | 6/1964 | Meinders ....................... 248/68.1 X |
| 3,915,420 | 10/1975 | Norris .................................. 248/58 |
| 3,938,767 | 2/1976 | Norris .................................. 248/58 |
| 3,960,350 | 6/1976 | Tardoskegyi .................. 248/68.1 X |
| 4,046,343 | 9/1977 | Kambara ............................. 248/49 |
| 4,088,293 | 5/1978 | Delmore ............................ 248/500 |
| 4,232,845 | 11/1980 | Turner ............................... 248/49 |
| 4,299,362 | 11/1981 | Buluschek .......................... 248/49 |
| 4,452,336 | 6/1984 | Sickler ................................ 182/82 |

FOREIGN PATENT DOCUMENTS 2437719  5/1980  France ............................... 248/68.1

OTHER PUBLICATIONS

Author: B-Line Systems, Inc.; Highland, IL; Title: Cable Tray Systems (Catalog); pp. 136, 138 and 139; Year: 1990.

Primary Examiner—Carl D. Friedman
Assistant Examiner—Derek J. Berger
Attorney, Agent, or Firm—Senniger, Powers, Leavitt & Roedel

[57] ABSTRACT

A support system for supporting cable tray of the type comprising a pair of generally parallel side rails interconnected by cross members. The support system comprises a series of support bars adapted to be suspended at intervals spaced lengthwise of the cable tray and with the support bars extending generally crosswise relative to the rails of the cable tray. Each support bar has a pair of rail receivers spaced apart lengthwise of the support bar for receiving the side rails of a cable tray and preventing substantial sideways shifting of the cable tray relative to the support bar. A pair of hold-down members associated with each support bar hold the rails of the cable tray in respective rail receivers of the support bar.

19 Claims, 6 Drawing Sheets

CABLE TRAY SUPPORT SYSTEM

BACKGROUND OF THE INVENTION

This invention relates generally to support systems, and more particularly to a system for supporting what is referred to in the trade as "cable tray", which is a support structure comprising a pair of parallel rails connected by cross members and used in commercial buildings to support long runs of electrical wiring, conduit and the like.

Prior to the present invention, cable tray has been supported in different ways, such as by a series of parallel support bars suspended (as by vertical rods) at intervals spaced lengthwise of the cable tray. The cable tray rests on these support bars and is held in position on the bars by hold-down members which are affixed to the support bars by suitable fasteners (e.g., bolts). These hold-down members are intended to prevent lateral shifting of the cable tray in the event the support bars tilt for some reason. However, if the hold-down members on a support bar are not tightened securely, there is a risk that they will slip under the load of the cable tray, allowing the cable tray to shift sideways and possibly even fall off of the support bar. To reduce the risk of this happening, the fasteners affixing the hold-down members to the support bar must be tightened very securely, which is burdensome to the person doing the tightening and which requires the use of heavy-duty fasteners capable of withstanding the forces involved.

SUMMARY OF THE INVENTION

Among the several objects of this invention may be noted the provision of an improved system for supporting cable tray of the type mentioned above; the provision of such a support system which eliminates the risk of cable tray shifting sideways relative to the support bars; the provision of such a support system utilizing hold-down members which do not bear the load of the cable tray in the event a support bar tilts off horizontal, thereby avoiding the need for the hold-down members to be tightened to the extent heretofore necessary; the provision of such a support system which readily accommodates different types of cable tray having rails of different cross sectional shapes; the provision of such a support system wherein the support bars can be wall mounted, or suspended by vertical rods at the centers of the bars, or suspended by vertical rods adjacent the ends of the bars; the provision of such a support system where the hold-down members, when affixed to the support bars, are automatically precisely positioned relative to the rails of the cable tray; the provision of such a support system where the hold-down members may be selectively applied in either a clamping mode in which the hold-down members are in clamping engagement with the rails of the cable tray, or a non-clamping mode in which the hold-down members are not in clamping engagement with the rails to permit thermal expansion and contraction of the rails lengthwise of the rails; the provision of such a system where installation of cable tray is facilitated and expedited; and the provision of such a support system which is relatively economical to manufacture and which eliminates the need for stocking a variety of support bars for cable tray of different construction.

Generally, this invention is directed to a support system for supporting cable tray of the type comprising a pair of generally parallel side rails interconnected by cross members. The support system comprises a series of support bars adapted to be suspended at intervals spaced lengthwise of the cable tray and with the support bars extending generally crosswise relative to the rails of the cable tray. Each support bar has a pair of rail receivers spaced apart lengthwise of the support bar for receiving the side rails of a cable tray and preventing substantial sideways shifting of the cable tray relative to the support bar. A pair of hold-down members is associated with each support bar for holding the rails of the cable tray in respective rail receivers of the support bar.

Other objects and features will be in part apparent and in part pointed out hereinafter.

BRIEF DESCRIPTION OF THE DRAWINGS

Corresponding reference characters represent corresponding parts throughout the several views of the drawings.

DETAILED DESCRIPTION OF THE PREFERRED EMBODIMENTS

Figure 1:
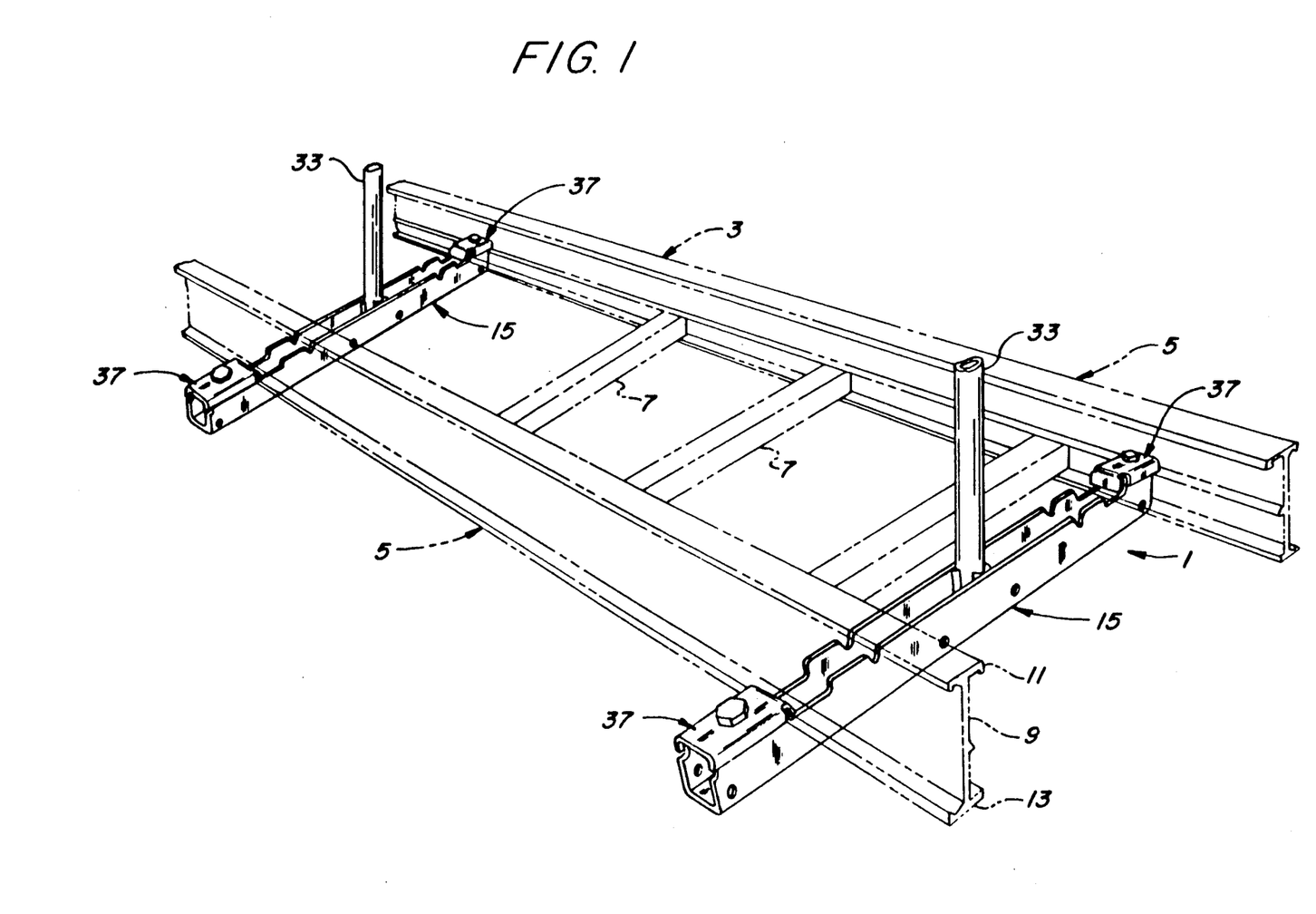
FIG. 1 is a perspective of a support system of the present invention supporting cable tray.
Figure 2:
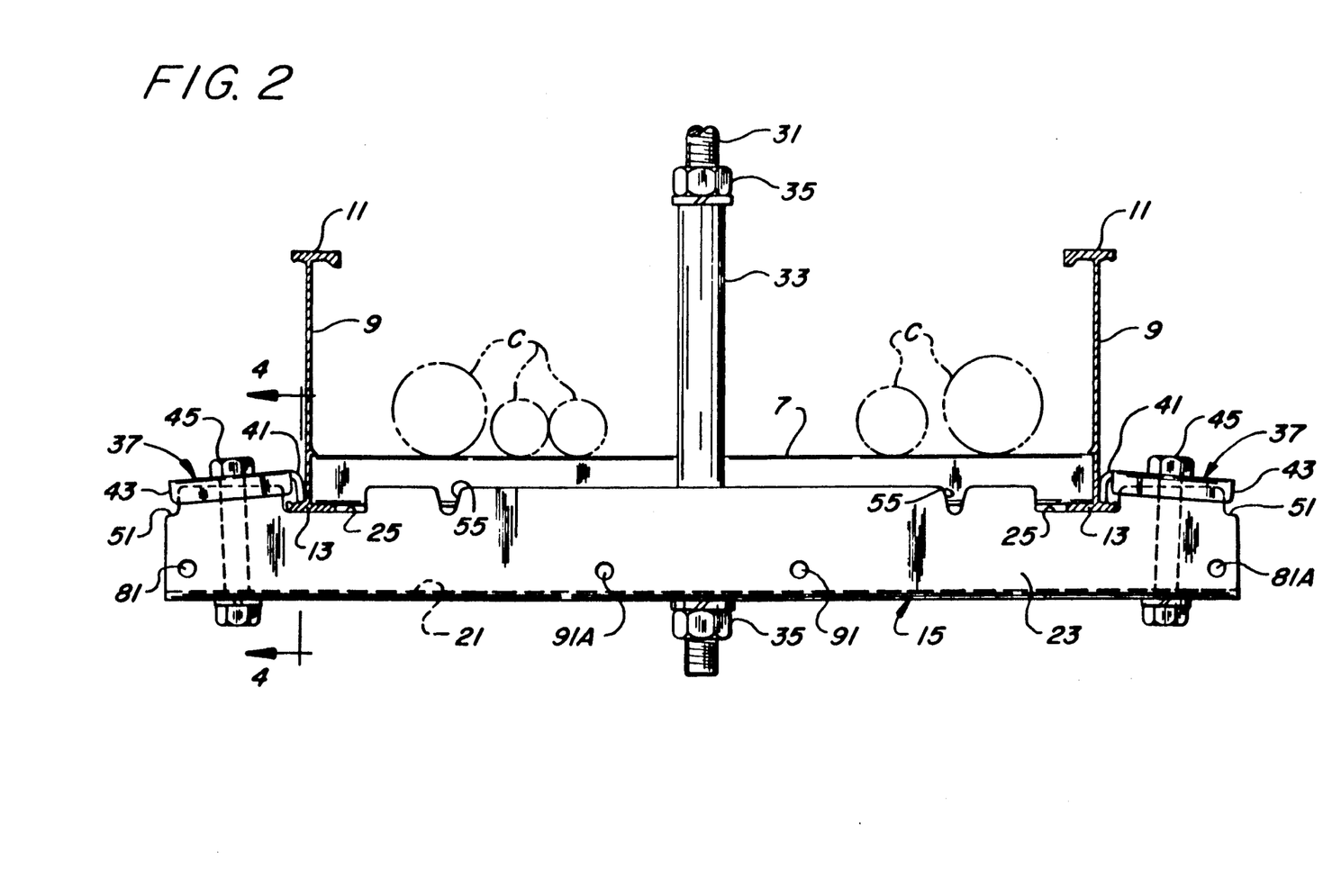
FIG. 2 is an elevational view showing a support bar of the system suspended by a single vertical rod at the center of the support bar, and two hold-down members mounted outboard of the rails of the cable tray in a clamping position.
Figure 3:
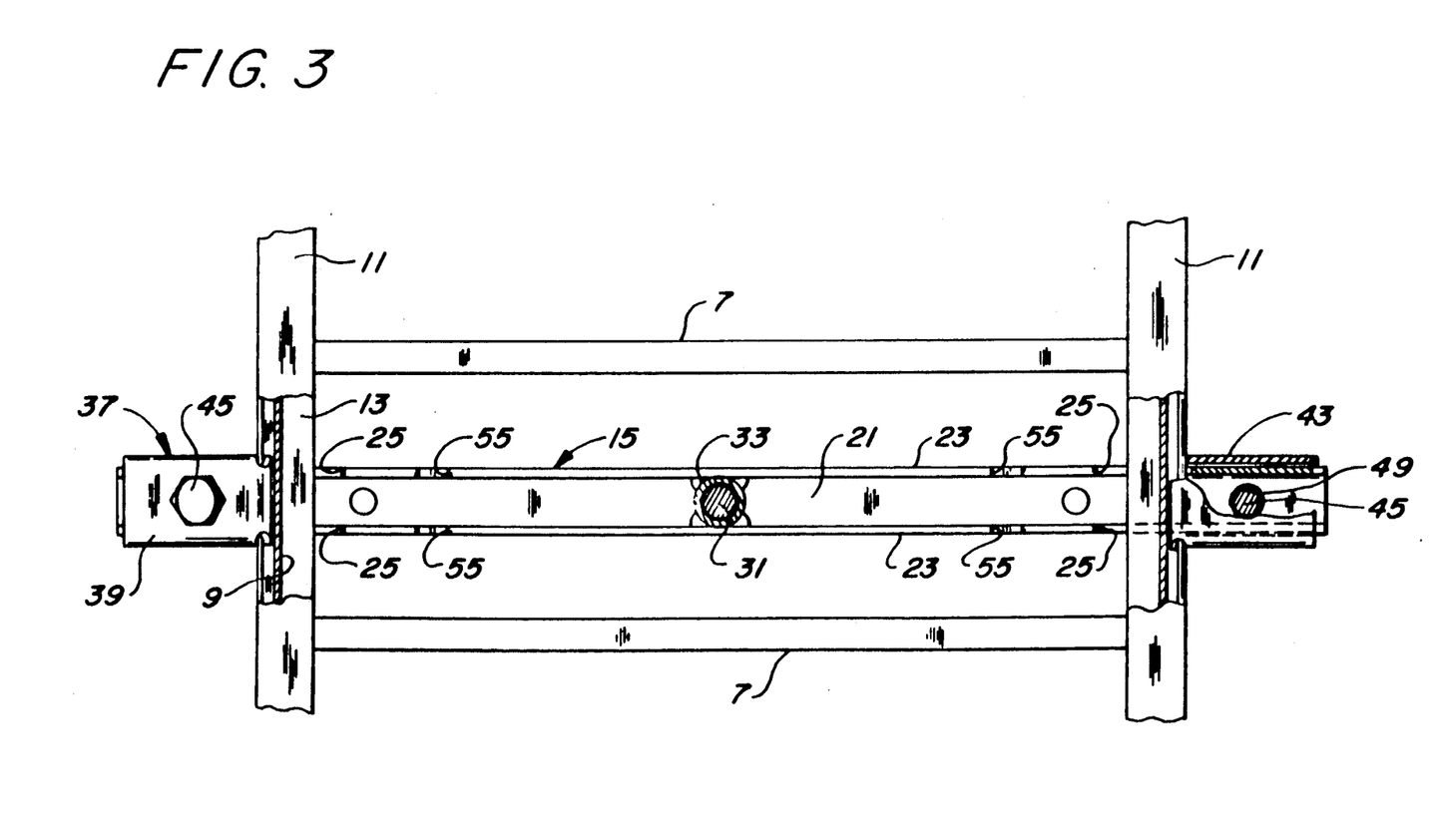
FIG. 3 is a plan view of FIG. 2 with parts broken away to show details.

Referring now to FIGS. 1-3, a support system of the present invention, indicated generally by the reference numeral 1, is shown supporting a run of cable tray indicated in phantom lines generally at 3. As illustrated, the cable tray is of the type comprising a pair of generally parallel side rails, each designated 5, interconnected by a series of parallel, spaced apart cross members 7. The cross-sectional shape of the rails will vary depending on the type of cable tray. For example, the cable tray shown in FIGS. 1-3 has rails formed from aluminum I beams, each thus having a vertical web 9 and upper and lower horizontal flanges indicated at 11 and 13, respectively, extending laterally from the web on opposite sides of the web. The cable tray is adapted to carry various types of conduit, for example, as indicated in phantom at C in FIG. 2.

The support system 1 comprises a series of support bars, each generally designated 15, adapted to be suspended at intervals spaced lengthwise of the cable tray 3 and with the support bars extending generally crosswise relative to the rails of the cable tray. As shown in FIG. 1, the support bars 15 lie in a single generally horizontal plane. However, it will be understood that the support bars could lie in planes other than horizontal for supporting non-horizontal (e.g., vertical) runs of cable tray.

Figure 4:
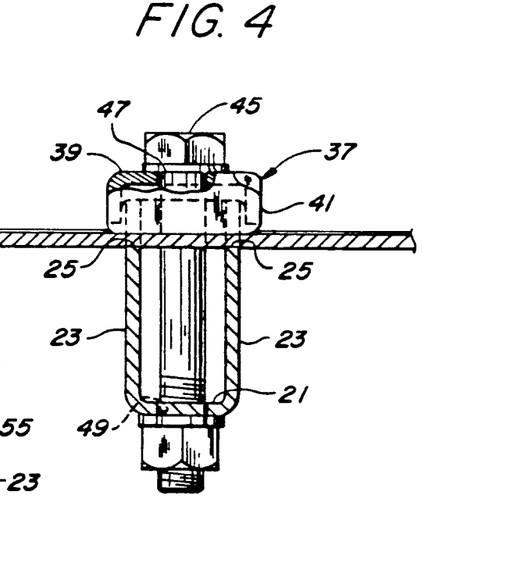
FIG. 4 is an enlarged vertical section taken on line 4—4 of FIG. 2.
Figure 5:
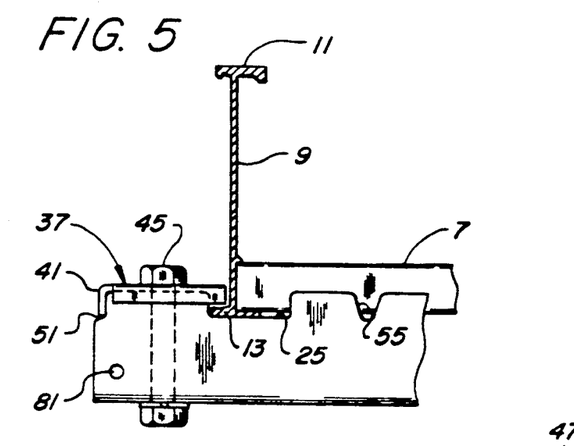
FIG. 5 is a partial view of FIG. 2 showing a hold-down member in a non-clamping position.

Referring now to FIGS. 2 and 4, it will be seen that each support bar is of generally U-shape in transverse section, the bar thereby having a bottom wall 21 and two opposing side walls, each designated 23, extending up from the bottom wall and terminating in upper edges extending longitudinally of the bar. Spaced inward from each end of the support bar is a pair of relatively wide rectangular notches (notch means) 25, each of which extends down from the upper longitudinal edge of a respective side wall 23 and has a width greater than the width of the lower flange 13 of a rail. Each notch has a generally straight bottom edge and opposite side edges extending generally at right angles to the bottom edge and to the length of the support bar. The two notches 25 of each pair of notches are aligned with one another longitudinally of the support bar and form what may be referred to broadly as a rail receiver for receiving the lower flange 13 of a respective side rail 5 of the cable tray and preventing substantial sideways shifting of the cable tray relative to the support bar. It will be understood that each of these rail receivers could take other forms (such as a single notch in a solid support bar, or spaced apart members extending up from the bar defining a space therebetween for receiving the rails) without departing from the scope of this invention.

In the embodiment of this invention shown in FIGS. 1–7, each support bar 15 is suspended in a generally horizontal position by means of a single vertical support rod 31 extending through a tubular hanger 33 located generally midway between the ends of the support bar. The tubular hanger is rigidly secured (as by welding) at its lower end to the support bar. Nuts 35 threaded on the rod above and below the hanger secure the support bar at the desired elevation on the rod.

A pair of hold-down members, each generally indicated at 37, are provided for holding the rails 5 of the cable tray in respective notches 25 (rail receivers or, more broadly, rail receiving means) of the support bar 15. Each hold-down member 37 comprises a generally flat plate 39 having a depending lip 41 at one end and depending side flanges 43 which are spaced apart a distance only slightly greater than the outside width of the support bar, so that when the hold-down member is mounted on the support bar as shown in FIGS. 2 and 4, the side flanges 43 extend down on the outside of the side walls 23 of the support bar to prevent relative rotation between the hold-down member and the support bar. The hold-down members 37 also serve to strengthen the support bar by preventing the sidewalls from spreading apart when the support bar is subjected to heavy loads adjacent to its ends as shown in FIG. 2. The hold-down members 37 are shown in FIG. 2 as being mounted in what may be referred to as a clamping position in which the lips 41 of the members extend down into respective notches 25 in the support bar for clamping engagement with the lower flanges 13 of the rails of the cable tray, thereby holding the rails in fixed position relative to the support bar. A suitable fastener 45 (e.g., a nut and bolt assembly) extending through an opening 47 in each hold-down member and an opening 49 in the bottom wall of the support bar secures the hold-down member in place and applies the force necessary to cause the hold-down member to clamp a respective rail. The opening 47 through the hold-down member (see FIG. 4) is preferably a non-threaded clearance opening, although it may also be a threaded opening to permit a bolt to be inserted shank first up through the opening 49 in the bottom wall of the support member and threaded into the opening in the hold-down member, thereby eliminating the need for a nut.

In accordance with this invention, the hold-down members 37 may also be selectively mounted on the support bar 15 in a non-clamping position (see FIG. 5) in which they are not in clamping engagement with the rails 5 to permit free lengthwise thermal expansion and contraction of the rails relative to the support bar. To do this, the fastener 45 securing each hold-down member is simply loosened, the hold-down member rotated 180° relative to the bar from its position shown in FIG. 2, so that the end of the hold-down member opposite the lip 41 extends over its respective pair of notches 25 and assumes a position in which it is clear of (or at least not in clamping engagement with) the lower flange 13 of the rail seated in the notches, and then the fastener 45 retightened. If the hole 47 through each hold-down member is a clearance hole rather than a threaded hole, the extent to which the fastener must be loosened to permit the hold-down member to be rotated is reduced. This may be advantageous in situations where the positions of the hold-down members must be changed. The side walls 23 of the support bar have recesses 51 therein adjacent their upper edges at opposite ends of the bar for receiving the lips 41 of the hold-down members when the hold-down members are in their non-clamping positions. The recesses are so positioned relative to the notches 25 (rail receivers) that when the lips of the hold-down members are in the recesses, the ends of the hold-down members opposite the lips are precisely and properly positioned lengthwise of the support bar relative to the notches and the rails therein.

Figure 6:
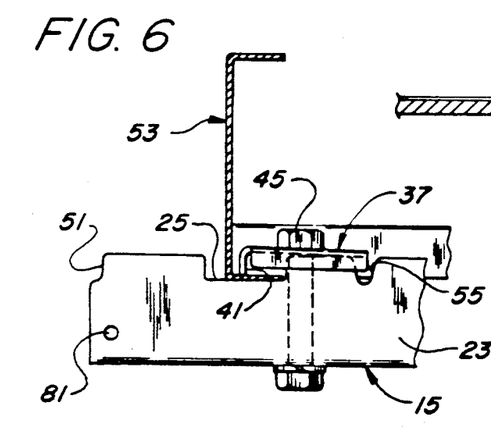
FIG. 6 is a view showing a hold-down member mounted inboard of the rails of a cable tray in a clamping position.
Figure 7:
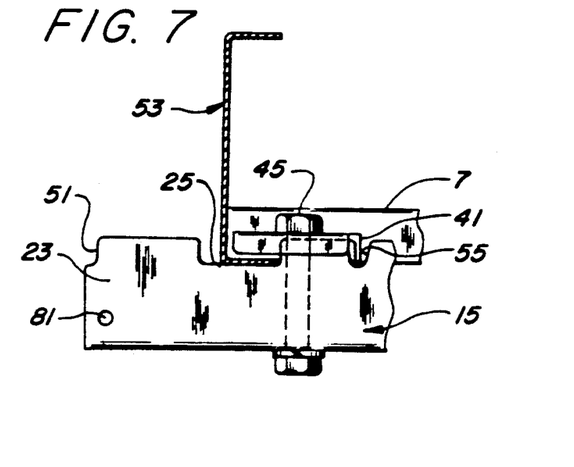
FIG. 7 is a view similar to FIG. 6 showing the hold-down member in a non-clamping position.

In the embodiment shown in FIGS. 1–5, the hold-down members 37 are mounted on the support bar 15 outboard of (that is, to the outside of) the rails 5 of the cable tray 3. In the embodiments shown in FIGS. 6 and 7, the hold-down members are shown mounted inboard of (that is, to the inside of) the rails to accommodate cable tray having rails of a different cross-sectional shape, such as the steel rails designated 53. To permit this versatility, the support bar 15 is provided with recesses indicated at 55 in the side walls 23 of the support bar inboard of (that is, to the inside of) the notches 25 (rail receivers). There are two pairs of such recesses 55, the two recesses of each pair being aligned lengthwise of the support bar for receiving the lip 41 of a respective hold-down member 37 when the hold-down member is in its non-clamping position (FIG. 7). Each pair of recesses 55 is so positioned that when the lip 41 of the hold-down member is disposed in the recesses, the opposite end of the hold-down member is properly positioned over the notches and relative to the rail. FIG. 6 illustrates a hold-down member in its clamping position and mounted inboard of a rail 53.

Figure 8:
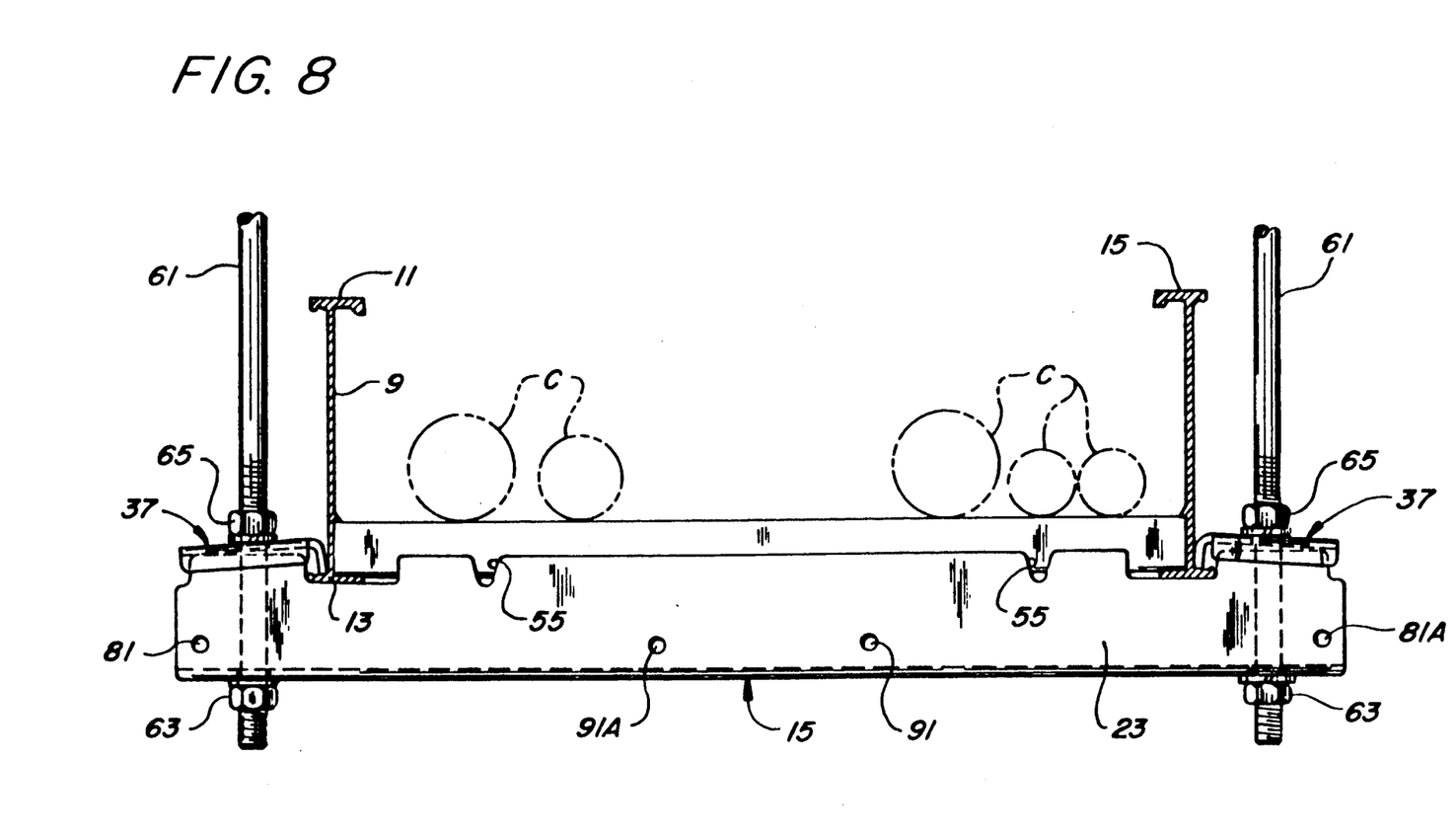
FIG. 8 is a view similar to FIG. 2 showing a support bar suspended by two vertical rods adjacent the ends of the bar.

FIG. 8 illustrates how a support bar 15 of the present invention may be suspended by two vertical rods 61, one adjacent each end of the bar ("trapeze" style), instead of by a single vertical rod at the center of the support bar. In this configuration, the vertical rods 61 replace the nut and bolt fasteners 45 described above for mounting the hold-down members 37 outboard of the rails, as occurs when the rails have the cross-sectional configuration shown. Two nuts are threaded on each rod, one (designated 63) below the bottom wall 21 of the support bar and the other (designated 65) above the hold-down member, to secure the support bar at the appropriate elevation. The hold-down members 37 may be selectively mounted in either clamping or non-clamping positions, as explained above. If required by the cross sectional configuration of the rails of the cable tray, hold-down members 37 may also be mounted inboard of the notches (rail receivers), as explained above, by suitable fasteners (e.g., 45). In this situation, the outboard hold-down members 37 may be replaced by flat washers or the like, if desired, to provide for attachment of the support bar to the two vertical rods 61.

Figure 9:
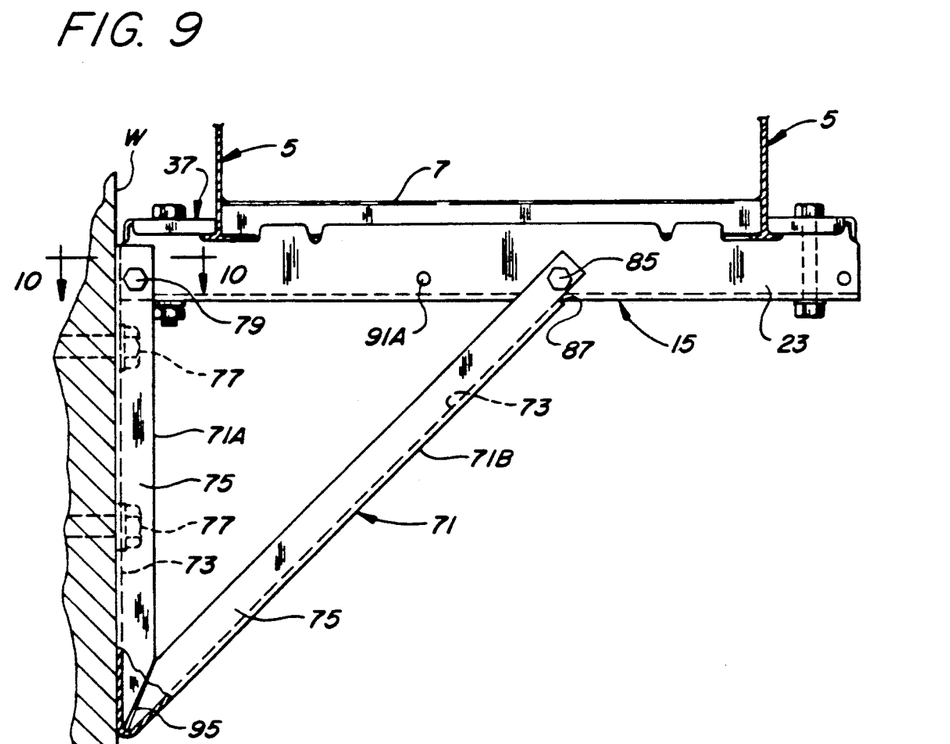
FIG. 9 is an elevation showing a support bar mounted on a wall by a bracket of this invention.
Figure 10:
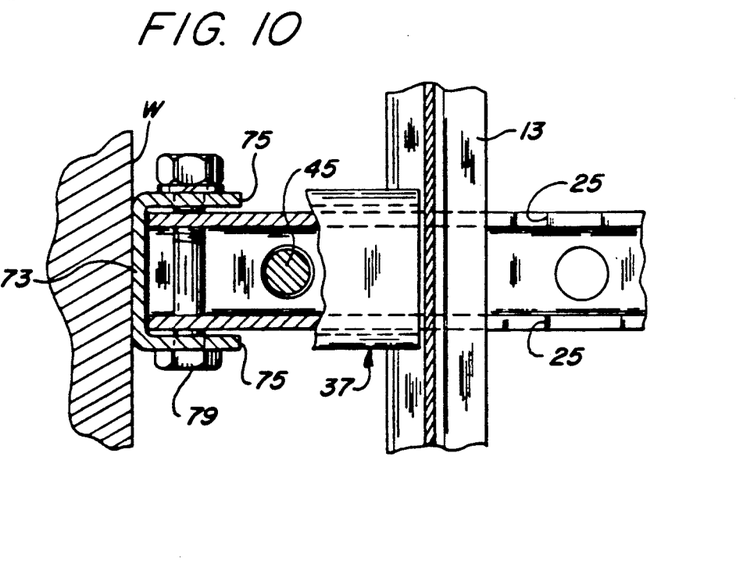
FIG. 10 is an enlarged horizontal section on line 10—10 of FIG. 9, portions being broken away to show details.

FIGS. 9 and 10 show the support bar 15 of the present invention as it may be mounted on a wall W, for example. This is accomplished by means of a bracket, generally designated 71, comprising a one-piece bar of generally channel shape having a bottom web 73 and two opposing flanges 75. The bar is bent to have a first generally vertical leg 71A adapted to be secured to the wall W, and a second leg 71B angling upwardly and away from the wall from the lower end of the first leg. The vertical leg 71A has a set of holes (not shown) in its bottom web 73 for receiving fasteners 77 to secure the leg to the wall, and another set of holes (not shown) in its flanges 75 adjacent the upper end of the leg for receiving a fastener 79 to secure one end of the support bar to the leg. This fastener 79 extends through aligned holes 81 in the side walls 23 of the support bar. The spacing between the flanges 75 of the channel-shaped bracket is preferably somewhat greater than the outside width of the support bar so that the support bar will fit between the flanges of the bracket as shown in FIG. 10. The upper end of the inclined leg 71B also has holes (not shown) therein for receiving a fastener 85 to secure the support bar to the leg at a point somewhat beyond the midpoint of the support bar. The bottom web 73 of the bracket is suitably notched as indicated at 87 at the upper end of the leg 71B to receive the support bar and thus provide a proper fit between the leg and the support bar. The fastener 85 extends through aligned openings 91 in the side walls 23 of the support bar. It will be noted that the support bar has two additional sets of openings 81A, 91A therein corresponding to the sets of openings 81 and 91, respectively. This enables the bracket 71 to be used regardless of which end of the support bar is adjacent the wall W.

The bracket is preferably manufactured and shipped in a straight configuration, and later bent in the field to the shape shown in FIG. 9. To permit easy but precise bending, the generally parallel flanges 75 of the bracket are formed with generally V-shaped notches 95 at the precise location where the bracket is to bend. The notches extend the full width of the flanges so that the bracket may readily be bent by hand. The notches 95 are configured so that opposing side edges of each notch are engageable with one another to stop bending of the bracket beyond the point at which the angle of the legs 71A, 71B matches the spacing of the holes 81, 91 (or 81A, 91A) in the support bar.

It will be observed from the foregoing that the support system of the present invention has several important advantages. In the event one or more support bars 15 tilt from their normally horizontal position, the edges of the notches 25 rather than the hold-down members 37 will bear substantially the entire load of the cable tray and its contents. The hold-down members 37 prevent the support bars from falling out of the notches. As a result, the fasteners 45 holding the hold-down members 37 in position do not need to be tightened to the extent heretofore necessary, and these fasteners may have a lower capacity rating. The system of the present invention is also extremely versatile in that the support bars 25 can be used to support cable tray having rails of different configuration. Moreover, the support bars can be suspended either by a single vertical rod in "center hung" fashion, or by two vertical rods in "trapeze" fashion, or wall mounted by brackets 71.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A support system for supporting cable tray of the type comprising a pair of generally parallel side rails interconnected by cross members, said support system comprising:

a series of support bars adapted to be suspended at intervals spaced lengthwise of the cable tray and with the support bars extending generally crosswise relative to the rails of the cable trays, each support bar having a pair of rail receivers spaced apart lengthwise of the support bar for receiving the side rails of a cable tray and preventing substantial sideways shifting of the cable tray relative to the support bar; and a pair of hold-down members associated with each support bar for holding the rails of the cable tray in respective rail receivers of the support bar, each rail receiver comprising notch means in the support bar, said notch means having side edges extending substantially at right angles to the length of the support bar, said side edges being engageable by respective side rails of the cable tray to (a) prevent substantial sideways shifting of the cable tray relative to the support bar and (b) to support substantially the entire load of the cable tray in the event the support bar tips from a generally horizontal position.

2. A support system as set forth in claim 1 wherein said notch means has a generally straight bottom edge extending generally at right angles to said side edges.

3. A support system as set forth in claim 1 wherein each support bar is of generally U-shape in transverse section, said bar thereby having a bottom wall and two opposing side walls extending up from the bottom wall and terminating in upper edges extending longitudinally of the bar, each of said notch means comprising two opposing notches in the side walls of the support bar extending down from the upper edges of the side walls, said opposing notches being aligned with one another longitudinally of the support bar for receiving a respective rail of the cable tray.

4. A support system as set forth in claim 1 wherein each hold-down member is adapted to be selectively tightened on a respective support bar in either a clamping position in which the hold-down member is firmly fixed in place for clamping engagement with a respective rail of said cable tray or in a non-clamping position in which the hold-down member is fixed firmly in place on the support bar but is not in clamping engagement with the rail thereby to permit lengthwise thermal expansion and contraction of the rail relative to the support bar.

5. A support system as set forth in claim 4 wherein said notch means has a generally straight bottom edge extending generally at right angles to said side edges.

6. A support system as set forth in claim 1 further comprising means generally midway between the ends of each bar for attachment of the bar to a generally vertical support rod whereby the support bar may be suspended in a generally horizontal position.

7. A support system as set forth in claim 1 further comprising means generally adjacent the ends of each bar for attachment of the bar to a pair of generally vertical support rods whereby the support bar may be suspended in a generally horizontal position.

8. A support system as set forth in claim 1 wherein said hold-down members are adapted to be mounted outboard of said rail receivers when cable tray having a first type of side rails is used and inboard of the rail receivers when cable tray having a second type of side rails is used.

9. A support system as set forth in claim 8 wherein each hold-down member is adapted to be selectively tightened on a respective support bar in either a clamping position in which the hold-down member is firmly fixed in place in clamping engagement with a respective rail of said cable tray or in a non-clamping position in which the hold-down member is firmly fixed in place on the support bar but is not in clamping engagement with the rail thereby to permit lengthwise thermal expansion and contraction of the rail.

10. A support system as set forth in claim 9 wherein said notch means has a generally straight bottom edge extending generally at right angles to said notch side edges.

11. A support system as set forth in claim 10 wherein each of said hold-down members has a depending lip at one end thereof adapted to extend down into said notch means and into clamping engagement with a respective rail member in said notch means when said hold-down member is in said clamping position, said hold-down member having an end opposite said lip which is adapted to extend over said notch means when said hold-down member is in said non-clamping position thereby to hold the rail in said notch means while permitting said lengthwise thermal expansion and contraction of the rail.

12. A support system as set forth in claim 11 further comprising recesses in said support bar located outboard of the rail receivers for receiving the lips of said hold-down members when the hold-down members are in their said non-clamping position and disposed outboard of the rail receivers, said recesses being so positioned relative to said notch means that when the lips of said hold-down members are in the recesses, the ends of the hold-down members opposite the lips are properly positioned lengthwise of the support bar relative to said notch means and rails therein.

13. A support system as set forth in claim 1 further comprising a fastener associated with said hold-down member adapted to be tightened for securing the hold-down member to the support bar, said fastener extending from the hold-down member to a position below the support bar whereby the fastener may be tightened from below the support bar to secure the hold-down member to the support bar.

14. A support system as set forth in claim 13 wherein each support bar is of generally U-shape in transverse section, said bar thereby having a bottom wall and two opposing side walls extending up from the bottom wall and terminating in upper edges extending longitudinally of the bar, each hold-down member being adapted to span the side walls of the support bar, said fastener associated with said hold-down member comprising a threaded bolt extending through a hole in said hold-down member and down through an opening in the bottom wall of the support bar.

15. A support system for supporting cable tray of the type comprising a pair of generally parallel side rails interconnected by cross members, said support system comprising:
a series of support bars adapted to be suspended at intervals spaced lengthwise of the cable tray and with the support bars extending generally crosswise relative to the rails of the cable trays, each support bar having a pair of rail receivers spaced apart lengthwise of the support bar for receiving the side rails of a cable tray and preventing substantial sideways shifting of the cable tray relative to the support bar; and
a pair of hold-down members associated with each support bar for holding the rails of the cable tray in respective rail receivers of the support bar, each hold-down member being adapted to be selectively mounted on a respective support bar in either a clamping position in which the hold-down member is adapted for clamping engagement with a respective rail of said cable tray or in a non-clamping position in which the hold-down member is not in clamping engagement with the rail to permit lengthwise thermal expansion and contraction of the rail relative to the support bar, each hold-down member being adapted to be mounted on a respective support bar by means comprising a vertical support rod and means for attaching the support bar to the rod for suspension of the support bar by the rod.

16. A support system for supporting cable tray of the type comprising a pair of generally parallel side rails interconnected by cross members, said support system comprising:
a series of support bars adapted to be suspended at intervals spaced lengthwise of the cable tray and with the support bars extending generally crosswise relative to the rails of the cable trays, each support bar having a pair of rail receivers spaced apart lengthwise of the support bar for receiving the side rails of a cable tray and preventing substantial sideways shifting of the cable tray relative to the support bar; and
a pair of hold-down members associated with each support bar for holding the rails of the cable tray in respective rail receivers of the support bar, each hold-down member being adapted to be selectively mounted on a respective support bar in either a clamping position in which the hold-down member is adapted for clamping engagement with a respective rail of said cable tray or in a non-clamping position in which the hold-down member is not in clamping engagement with the rail to permit lengthwise thermal expansion and contraction of the rail relative to the support bar, each of said rail receivers being formed by notch means in the support bar, and each of said hold-down members having a depending lip at one end thereof adapted to extend down into said notch means and into clamping engagement with a respective rail member in said notch means when said hold-down member is in said clamping position, said hold-down member having an end opposite said lip which is adapted to extend over said notch means when said hold-down member is in said non-clamping position thereby to hold the rail in said notch means while permitting said lengthwise thermal expansion and contraction of the rail.

17. A support system as set forth in claim 16 further comprising recesses in said support bar for receiving the lips of said hold-down members when the hold-down members are in said non-clamping position, said recesses being so positioned relative to said notch means that when the lips of said hold-down members are in said recesses, the ends of the hold-down members opposite said lips are properly positioned lengthwise of the support bar relative to said notch means and rails therein.

18. A support system for supporting cable tray of the type comprising a pair of generally parallel side rails interconnected by cross members, said support system comprising:
   a series of support bars adapted to be suspended at intervals spaced lengthwise of the cable tray and with the support bars extending generally crosswise relative to the rails of the cable trays, each support bar having a pair of rail receivers spaced apart lengthwise of the support bar for receiving the side rails of a cable tray and preventing substantial sideways shifting of the cable tray relative to the support bar; and
   a pair of hold-down members associated with each support bar for holding the rails of the cable tray in respective rail receivers of the support bar, each hold-down members being adapted to be mounted outboard of said rail receivers when cable tray having a first type of side rails is used and inboard of the rail receivers when cable tray having a second type of side rails is used, each hold-down member being adapted to be mounted on a respective support bar in either a clamping position in which the hold-down member is in clamping engagement with a respective rail of said cable tray or in a non-clamping position in which the hold-down member is not in clamping engagement with the rail thereby to permit lengthwise thermal expansion and contraction of the rail, each of said notch means having a generally straight bottom edge extending generally at right angles to said notch side edges, each of said hold-down members having a depending lip at one end thereof adapted to extend down into said notch means and into clamping engagement with a respective rail member in said notch means when said hold-down member is in said clamping position, said hold-down member having an end opposite said lip which is adapted to extend over said notch means when said hold-down member is in said non-clamping position thereby to hold the rail in said notch means while permitting said lengthwise thermal expansion and contraction of the rail, and recesses in said support bar located inboard of the rail receivers for receiving the lips of said hold-down members when the hold-down members are in their said non-clamping position and disposed inboard of the rail receivers, said recesses being so positioned relative to said notch means that when the lips of said hold-down members are in the recesses, the ends of the hold-down members opposite the lips are properly positioned lengthwise of the support bar relative to said notch means and rails therein.

19. A support system for supporting cable tray of the type comprising a pair of generally parallel side rails interconnected by cross members, said support system comprising:
   a series of support bars adapted to be suspended at intervals spaced lengthwise of the cable tray and with the support bars extending generally crosswise relative to the rails of the cable trays, each support bar having a pair of rail receivers spaced apart lengthwise of the support bar for receiving the side rails of a cable tray and preventing substantial sideways shifting of the cable tray relative to the support bar; and
   a pair of hold-down members associated with each support bar for holding the rails of the cable tray in respective rail receivers of the support bar; and
   a bracket for mounting each support bar on a wall, said bracket comprising a one-piece bar adapted to be bent to have a first leg having openings therein to receive fasteners to secure the leg to the wall and to the support bar adjacent one end thereof, and a second leg extending from the first leg and having openings therein to receive fasteners to secure the leg to the support bar at a location spaced from said one end of the support bar.

* * * * *